Feb. 19, 1935. Z. E. FLICK ET AL 1,991,893
METALLIC PACKING
Filed March 28, 1934  2 Sheets-Sheet 2

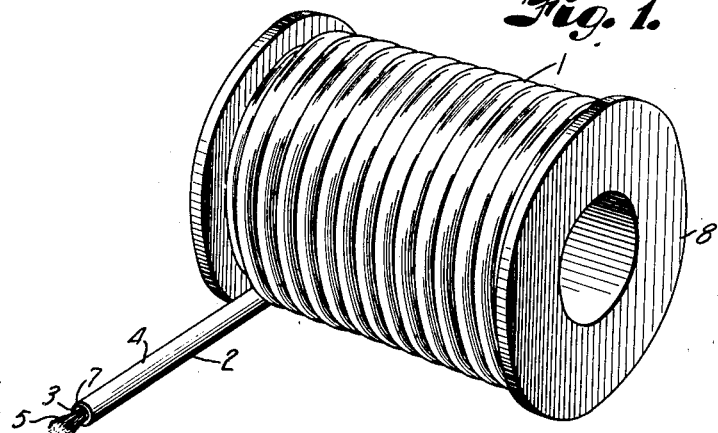
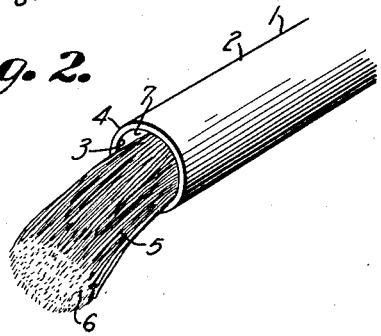
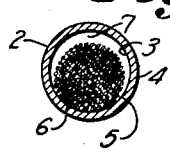
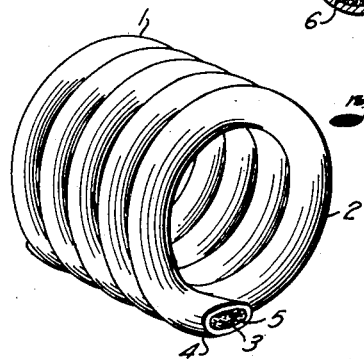
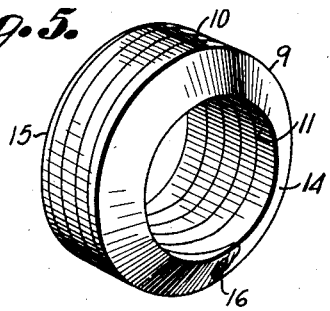
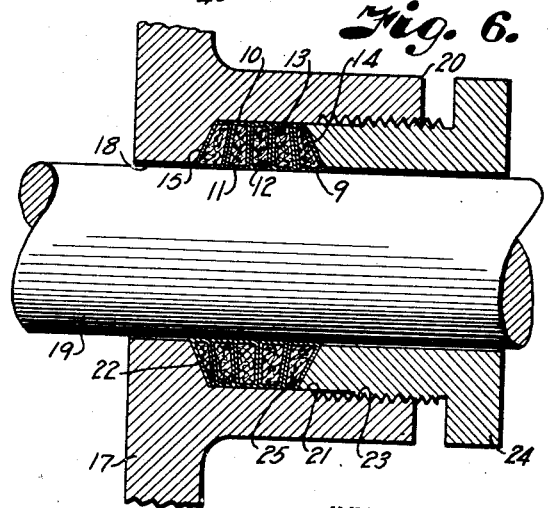
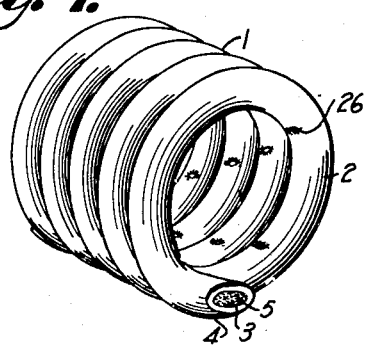

INVENTORS
Zeno E. Flick and
Jacob R. Price
BY
ATTORNEY

Patented Feb. 19, 1935

1,991,893

UNITED STATES PATENT OFFICE 1,991,893

METALLIC PACKING

Zeno E. Flick, Jackson, Mich., and Jacob R. Price, Kansas City, Mo.

Application March 28, 1934, Serial No. 717,814

2 Claims. (Cl. 154—45.5)

This invention relates to metallic packing and more particularly to a packing of this character for use in bearings, stuffing boxes, and the like, and has for its principal object to provide a combination packing which not only functions to provide a seal, but also serves as a metallic bearing liner.

Other important objects of the invention are to provide a bearing packing which is preformed to readily take the identical shape of a bearing when the packing is compressed therein, to provide a packing containing a lubricant adapted to be exuded therefrom when in use in a bearing, to provide a freely compressible packing which may be adjusted from time to time in maintaining its seal and bearing surface over long periods of use, to provide a bearing capable of seating in scored grooves and worn places in the bearing surfaces of a shaft, and to provide a packing which will not become disintegrated or dispersed because of such scores and worn surfaces.

In accomplishing these and other objects of the invention, we have provided improved details of structure, the preferred forms of which are illustrated in the accompanying drawings, wherein:

Fig. 1 is a perspective view of our improved metallic packing wound on a spool for storage.

Fig. 2 is an enlarged detail perspective view of a packing particularly illustrating the wick like core which allows the packing to readily take the form of a bearing and which serves to retain a lubricant.

Fig. 3 is a cross sectional view through the packing showing the space within the tube which renders the packing very elastic and easily deformable so that it readily takes the shape of a bearing in which it is inserted.

Fig. 4 is an enlarged perspective view of a portion of a packing in coil form ready to be compressed into substantially the form of a bearing.

Fig. 5 is a similar view after the packing has been compressed and ready to be inserted into a bearing.

Fig. 6 is a sectional view through a bearing and stuffing box illustrating a packing unit such as illustrated in Fig. 5 in position for sealing a rotating shaft.

Fig. 7 is a view similar to Fig. 4 showing the inner portions of the coils perforated to provide openings through which the lubricant is exuded.

Figure 8:
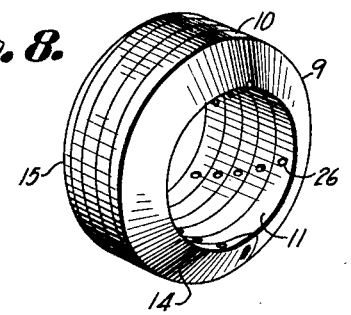
Fig. 8 is a perspective view of a finished packing unit resulting from the coiled form shown in Fig. 7.
Figure 9:
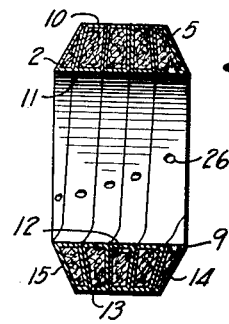
Fig. 9 is a longitudinal sectional view through the form of packing shown in Fig. 8.

Referring more in detail to the drawings:

1 designates a metallic packing embodying the features of the present invention and which is shown as including a continuous length tubing which has been extruded from relatively soft, formative metal, such as is used in bearings, for example, a metallic alloy adapted to resist action of air, water, lubricant, and chemicals with which the packing is contacted.

The wall 2 of the tubing is preferably circular in cross section and has imperforate unbroken inner and outer surfaces 3 and 4 and is capable of distortion when the packing is placed in a bearing, as later described.

Enclosed in the tubing is a wick like core 5 consisting of a plurality of loosely arranged strands 6 of fibrous material such as flax, fabric, asbestos, or the like, and which is of such size as to leave a substantially unfilled space within the tube, as indicated at 7, so that the core does not act to prevent distortion of the tubing when the packing is compressed in a bearing.

The wick like core, however, has sufficient body to prevent sharp bending or kinking of the tube when it is stored upon a spool 8, as indicated in Fig. 1. The core is preferably impregnated with a liquid lubricant which may contain a quantity of graphite and which is adapted to be exuded from the tube after the packing is placed for reception in the bearing.

Due to the fact that the wall of the tubing is imperforate, the packing may be readily stored without loss of the lubricant from the core, but when the packing is coiled in the bearing and compressed, the lubricant is exuded from the ends of the coiled tubing or through specially prepared openings to supply lubricant to a shaft around which the packing is installed.

In using the packing, sections of the tubing may be uncoiled from the spool 8 and formed into a spiral coil as indicated in Fig. 4 by wrapping the packing around the shaft and sliding it into a bearing, after which the coils are compressed to take the form of the bearing and provide a fluid tight seal between a bearing and the shaft or other moving parts supported thereby.

We prefer, however, to preform the packing into substantially the shape of the bearing in which it is installed by compressing the coiled form shown in Fig. 4 in suitable dies to form a substantially unitary ring 9 having cylindrical outer and inner surfaces 10 and 11 substantially conforming to the outer and inner diameters of the bearing in which the packing is to be installed.

When compressed, as shown in Fig. 5, the adjacent side faces 12 and 13 of the coils are pressed into close contiguity with each other and the end faces 14 and 15 of the outer coils are bevelled toward the periphery to conform to the end portions of a bearing.

When the coils are compressed, as shown in Fig. 5, the wicking is exposed at the ends thereof, as shown at 16, to allow exudation of the lubricant which has been impregnated in the wick like core.

In Fig. 6 is illustrated the packing unit as installed in a combination bearing and stuffing box which includes a wall portion 17 having an opening 18 to pass a shaft 19 which extends through the stuffing box 20 formed as an integral part of the wall 17. The outer end of the stuffing box is provided with an annular recess 21 terminating in an inclined seat 22 and the outer end of the recess is internally threaded as at 23 to receive a packing nut or gland 24 having an inner face bevelled as at 25 to conform to the oppositely inclined bevelled seat 22.

The stuffing box just described is of conventional type and is illustrated and described to show the adaptation of our improved packing units.

In using a packing unit as illustrated in Fig. 5, the packing gland 24 is removed from the packing box and the packing unit is slid over the outer end of the shaft until the bevelled end 15 thereof seats against the inclined seat 22.

The packing gland 24 is then reinserted in the stuffing box and tightened against the opposite bevelled end of the packing to force the inner periphery of the packing ring into sealing contact with the surface of the shaft 19.

Compression of the packing unit will cause slight exudation of the oil from the core, to lubricate the bearing.

The metallic portion of the packing which is forced into sealing contact with the shaft thus forms a substantially continuous unbroken bearing surface substantially in the same manner as a conventional piston bearing.

Should the shaft have become worn, the packing gland is simply tightened. The deformable nature of the packing allows the packing to adjust itself to any irregularities or worn surfaces in the shaft. The packing, therefore, not only maintains a positive seal, but also serves the purpose of a bearing liner for supporting the shaft.

Should more lubricant be required, the inner periphery of the coils of the tubing can be perforated as shown in Fig. 7 to provide openings 26 in the inner periphery of the packing unit, as shown in Fig. 8.

Figure 10:
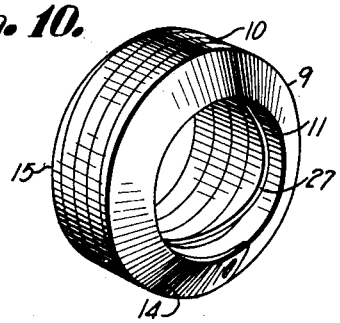
Fig. 10 is a perspective view showing a preformed packing unit provided with a spiral lubricant exuding groove.
Figure 11:
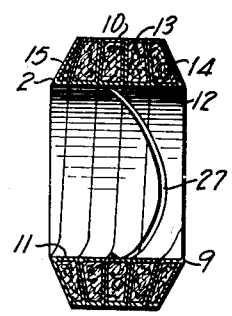
Fig. 11 is a longitudinal section through the form of packing shown in Fig. 10.

Fig. 10 shows a further modified method of providing for exudation of the lubricant which consists of forming a spiral groove 27 in the inner face of the packing unit so that the lubricant may be exuded entirely around the periphery of the shaft.

Figure 12:
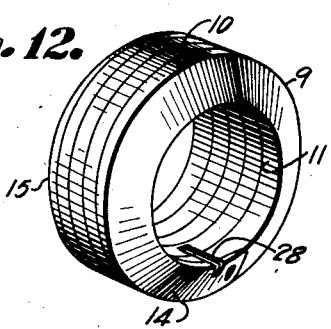
Fig. 12 is a further modified form of packing showing a lubricant exuding groove formed in the inner ends of the packing.
Figure 13:
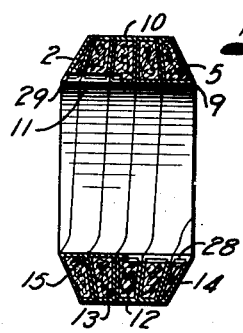
Fig. 13 is a sectional view through the modified form shown in Fig. 12.

In Fig. 12, recesses 28 and 29 are formed in the outer ends of the packing unit at opposite diametrical sides so that it is not necessary to cut across all of the coils to prevent weakening the structure.

Figure 14:
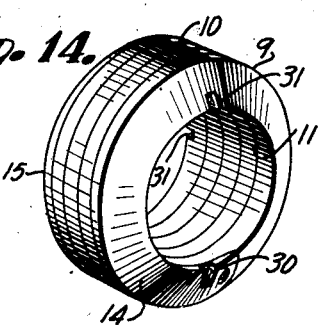
Fig. 14 is a further modified form showing the lubricant exuding grooves in the ends of the packing.
Figure 15:
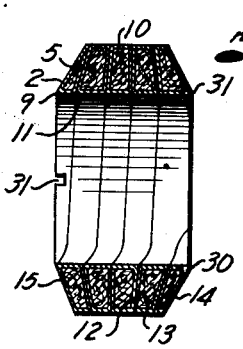
Fig. 15 is a sectional view through the form of packing shown in Fig. 14.

In Fig. 14, the inner faces of the coil portions of the packing unit are substantially unbroken, but the bevelled ends are notched to provide lubricant exuding openings 30 and 31.

Figure 16:
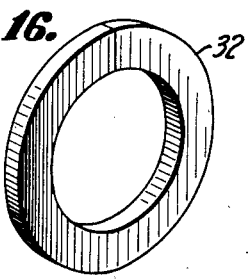
Fig. 16 is a perspective view of a single coil of the packing preformed into a flat ring shape.

In Fig. 16, is shown a type of packing which may be used where it is not convenient to slide a complete packing unit over the end of a shaft.

In this form, the sections of packing are cut from the spool 8 and formed into individual rings which are flattened, as shown, to form a substantially washer like member 32 having the outer diameter of the bearing and an inner diameter conforming to the diameter of the shaft with which the packing is to be employed.

In installing a packing constructed of individual washer like rings, as shown, in Fig. 16, the individual rings are spread apart so that they will pass over the shaft, after which the individual rings are constricted about the shaft so that they will enter the bearing space in substantially the same manner as the packing illustrated in Fig. 6.

Figure 17:
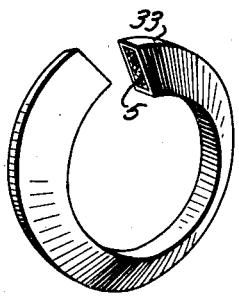
Fig. 17 is a further modified form of a single ring structure preshaped to conform to the end wall of a bearing.

After long use, and when the packing can no longer be compressed, a bevelled ring 33, as shown in Fig. 17, will be applied and the packing gland 24 threaded into the packing box to compress the ring into sealing engagement with the shaft, which will again reestablish the effectiveness of the seal.

From the foregoing, it is apparent that we have provided a packing which, due to its imperforate nature, may be stored on spools without effecting loss of the lubricant in the core and which, due to the nature and size of the core may be readily coiled into bearing shape and compressed to take the exact form of the bearing.

Also due to the relative size of the core and tubing, the packing is very elastic and easily deformable so that it forms a substantially solid bearing support for a shaft entirely across the width of the bearing, thereby not only maintaining a positive seal, but at the same time serving as a metallic bearing liner.

It is also apparent that the packing is impervious to acids, lubricant and other fluids which may come in contact with the bearing and is non-resistant to heat under normal working conditions.

Attention is particularly directed to the fact that the tubing does not rupture when compressed in a bearing, but retains its tubular shape even though it has been deformed in application. This is due to the nature and relative size of the core whereby a substantially unfilled space is left in the tubing.

What we claim and desire to secure by Letters Patent is:

1. A bearing packing including an imperforate tube, and a wick in the tube of such size as to leave material space in the tube whereby when the packing is coiled and compressed in a bearing the packing is very elastic and easily deformable to take the form of the bearing.

2. A bearing packing including an imperforate tube, and a wick in the tube composed of loose strands of flax of such size as to leave material space in the tube whereby when the packing is coiled and compressed in a bearing the packing is very elastic and easily deformable to take the form of the bearing.

ZENO E. FLICK.
JACOB R. PRICE.